(12) United States Patent
deBonoPaula (10) Patent No.: US 9,196,174 B2
(45) Date of Patent: Nov. 24, 2015

(54) EMBROIDERED STICKS

(71) Applicant: Lisa deBonoPaula, San Antonio, TX (US)

(72) Inventor: Lisa deBonoPaula, San Antonio, TX (US)

( * ) Notice: Subject to any disclaimer, the term of this patent is extended or adjusted under 35 U.S.C. 154(b) by 0 days.

(21) Appl. No.: 13/705,893

(22) Filed: Dec. 5, 2012

(65) Prior Publication Data

US 2013/0143187 A1 Jun. 6, 2013

Related U.S. Application Data

(60) Provisional application No. 61/566,989, filed on Dec. 5, 2011.

(51) Int. Cl.
*G09B 11/00* (2006.01)
*G09B 19/00* (2006.01)

(52) U.S. Cl.
CPC ....................................... *G09B 19/00* (2013.01)

(58) Field of Classification Search
USPC ............. 434/81, 83, 219, 236; 63/40; 112/78, 112/99, 439
See application file for complete search history.

(56) References Cited

U.S. PATENT DOCUMENTS

| | | | | |
|---|---|---|---|---|
| 2,512,485 | A * | 6/1950 | Cougias | 434/238 |
| 4,214,463 | A * | 7/1980 | Blumhof | 70/456 R |
| 4,807,379 | A * | 2/1989 | Blumhof | 40/653 |
| 5,611,160 | A * | 3/1997 | Topitzes | 40/1.6 |
| 5,884,944 | A * | 3/1999 | Durham | 283/67 |
| 6,004,232 | A * | 12/1999 | Sennott | 473/502 |
| 6,550,813 | B1 * | 4/2003 | Siegrist | 283/74 |
| 6,880,364 | B1 * | 4/2005 | Vidolin et al. | 63/40 |
| 6,926,529 | B1 * | 8/2005 | Voit | 434/167 |
| 7,665,220 | B1 * | 2/2010 | Gee | 33/511 |
| 2005/0034343 | A1 * | 2/2005 | Weisbart | 40/654.01 |
| 2005/0037323 | A1 * | 2/2005 | Basson | 434/236 |
| 2005/0044763 | A1 * | 3/2005 | Smith | 40/605 |
| 2007/0118977 | A1 * | 5/2007 | Brier, Jr. | 2/338 |
| 2013/0228408 | A1 * | 9/2013 | Lease et al. | 190/18 A |

* cited by examiner

*Primary Examiner* — Kurt Fernstrom
(74) *Attorney, Agent, or Firm* — Nevrivy Patent Law Group P.L.L.C.

(57) ABSTRACT

The invention relates to an embroidered stick for attaching to and displaying on an article. The embroidered stick comprises a hole for attaching it to an article. The embroidered sticks can be obtained by users as rewards, incentives, to promote certain behaviors, activities, events, messages, logos, mascots, achievements, campaigns, brands, products and/or services, companies, organizations, themes or the like.

12 Claims, 7 Drawing Sheets

EMBROIDERED STICKS

CROSS-REFERENCE TO RELATED APPLICATIONS

This application claims the benefit of provisional U.S. Appl. No. 61/566,989, filed Dec. 5, 2011. The content of the aforesaid application is relied upon and incorporated by reference in its entirety.

BACKGROUND OF THE INVENTION

1. Field of the Invention

The field of the invention relates generally to encouraging and promoting positive behaviors through rewards or incentives, and more specifically, to encouraging and motivating children, particularly school age children. The field of the invention also relates to embroidered articles, particularly for use as rewards or incentives for school age children. The field of the invention also relates to embroidered articles to reward activity, promote certain messages and/or behaviors in various environments and contexts, such as the workplace, school, political and/or public awareness campaigns, consumer, or business environments and contexts.

2. Related Art

Using rewards or incentives is a common technique to attempt to alter behavior and is a form of positive reinforcement. This contrasts with a punishment or negative reinforcement when certain behaviors are present. It is generally regarded that positive reinforcement is superior to punishment or negative reinforcement in altering behavior, however, there can be some variation between individuals and different situations/contexts. In many instances, positive reinforcement can result in lasting behavioral modification, whereas punishment changes behavior only temporarily and presents many detrimental side effects.

Positive reinforcement using rewards or incentives occurs in most, if not all human environments and contexts, including at home, school, the workplace, sports, clubs, organizations, business and consumer contexts, personal relationships, etc. Promoting positive behaviors in individuals is highly desired for individuals, families, and for the society as a whole. This is particularly true for children as part of their education and upbringing, both at home and in school environments. Some examples of children's behavior that is generally reinforced and rewarded include attendance, academic performance, chores, getting along well with others, following rules, directions and/or routines, generosity and kindness and the like.

There many efforts underway to improve the quality of education and improve learning and behavior in children. In spite of this, many children continue to perform poorly in school or at least fail to live up to their true learning and behavioral potentials.

A common reason for poor performance and interest in school generally relates to a lack of motivation. Many children do not try their hardest in classroom assignments and homework because the benefits are not immediately tangible and often will not manifest themselves for several years.

There is a need for new and effective ways to promote certain messages and/or behaviors in various environments and contexts, including rewarding and incentivizing the behavior of children, particularly school age children.

This background information is provided for the purpose of making information believed by the applicant to be of possible relevance to the present invention. No admission is necessarily intended, nor should it be construed, that any of the preceding information constitutes prior art against the present invention.

BRIEF SUMMARY OF THE INVENTION

In one aspect, the invention provides an embroidered stick. In some embodiments, the embroidered stick is for rewarding a student for achievement for a selected activity or to generally promote school spirit, a student's well being and/or self esteem.

In some embodiments, the embroidered stick attaches to and displays on a student's possession such as clothing, a lanyard, a backpack, zipper, shoe lace or a key ring, wherein the embroidered stick comprises an embroidered article comprising a front and back, two ends and two sides that are substantially longer than the ends, wherein the article does not curl along its sides during use, and the article further comprises a means for attaching one of its ends to the student's possessions. In some embodiments, the article relates to a selected activity of the student or includes the school's name, logo or mascot.

In another aspect, the invention provides methods for rewarding a student, comprising providing the student with an embroidered stick, wherein the stick can be attached to and displayed on the student's possessions such as clothing, a lanyard, a backpack, shoe lace or a key ring, the reward stick comprising a front and back, two ends and two sides that are substantially longer than the ends, wherein the reward stick does not curl along its sides during use, and the reward stick further comprises a means for attaching one of its ends to the student's possessions. In some embodiments, the stick relates to a specified activity of the student, and the student is rewarded for achieving or performing the specified activity.

It is to be understood that both the foregoing general description and the following detailed description are exemplary, and thus do not restrict the scope of the invention.

BRIEF DESCRIPTION OF THE FIGURES

The skilled artisan will understand that the drawings, described below, are for illustration purposes only. The drawings are not intended to limit the scope of the present teachings in any way.

DETAILED DESCRIPTION

For the purposes of promoting an understanding of the principles of the invention, reference will now be made to certain embodiments and specific language will be used to describe the same. It will nevertheless be understood that no limitation of the scope of the invention is thereby intended, and alterations and modifications in the illustrated article of manufacture, and further applications of the principles of the invention as illustrated therein are herein contemplated as would normally occur to one skilled in the art to which the invention relates.

Unless defined otherwise, all technical and scientific terms used herein have the same meaning as commonly understood by one of ordinary skill in the art to which this invention pertains.

For the purpose of interpreting this specification, the following definitions will apply and whenever appropriate, terms used in the singular will also include the plural and vice versa. In the event that any definition set forth below conflicts with the usage of that word in any other document, including any document incorporated herein by reference, the definition set forth below shall always control for purposes of interpreting this specification and its associated claims unless a contrary meaning is clearly intended (for example in the document where the term is originally used). The use of "or" means "and/or" unless stated otherwise. The use of "a" herein means "one or more" unless stated otherwise or where the use of "one or more" is clearly inappropriate. The use of "comprise," "comprises," "comprising," "include," "includes," and "including" are interchangeable and not intended to be limiting. Furthermore, where the description of one or more embodiments uses the term "comprising," those skilled in the art would understand that, in some specific instances, the embodiment or embodiments can be alternatively described using the language "consisting essentially of" and/or "consisting of."

The present invention is directed to embroidered sticks. In some embodiments, the embroidered sticks can be obtained by users as rewards, incentives, to promote certain behaviors, activities, events, messages, logos, mascots, achievements, campaigns, brands, products and/or services, companies, organizations, themes or the like. The embroidered sticks can be used in various contexts and environments, including, but not limited to school, home, clubs or organizations, athletics, work, business and other consumer contexts and various social environments and contexts, marketing and branding contexts and in political or public awareness contexts.

The embroidered sticks can be used in various educational environments, such as, for example, preschool, elementary school, middle school, high school, college, graduate school, employee training programs, and professional and continuing education programs.

In some embodiments, embroidered sticks comprise one or more words, phrases, logos, designs or combinations thereof. In some embodiments, a school or organization name can appear on the embroidered stick, or a word, phrase or logo associated with the organization, such as a mascot name for a school or sports team. In some embodiments, words associated with an achievement or activity are on the embroidered stick, such as, for example, "Perfect Attendance," "On Time," "Honor Roll," "Spelling Bee," "Spirit," "A+ student" "Healthy," "Math and Science," "Reading," "Great Attendance" and the like. In some embodiments, in the context of sporting events, slogans for athletic teams are present, such as "Go Tigers!," "Hook 'em Horns!," "Roll Tide!" and the like. Numerous other alternatives, modifications, and variations will be apparent to those skilled in the art.

In some embodiments, the embroidered sticks are an embellishment of a fabric in which colored threads are sewn on to the fabric to create a design. Embroidery is "thread art" used to embellish a product by adding a sewing pattern. In some embodiments, this sewn pattern includes a design and can also include lettering.

In some embodiments, the embroidered stick has a hole, such as a reinforced hole to make it possible to hang them on a key ring or similar display instrument or article. In some embodiments, the hole area is reinforced with border stitching. This enables the edges to be relatively smooth, neat and durable so that tearing, ripping, snagging or fraying is reduced. In some embodiments, the hole is positioned close to one of the ends of the embroidered stick. The embroidered sticks can be embroidered with any phrase, word, icon or artwork as directed.

In some embodiments, the embroidered sticks have a substantially rectangular shape, having a front and back, two ends and two sides that are longer than the ends. The size of the embroidered sticks is not limiting. In some embodiments, the stick is from about 3.5" to about 10"×about 1" to about 4". In some embodiments, the stick is from about 1.75" to about 4.5"×about 0.3" to about 1.0". In some embodiments, the embroidered stick is typically about 3.25"×0.5" or 8.255 cm×1.27 cm. In some embodiments, the stick is from about 0.3" to about 2"×about 0.2" to about 0.8". In some embodiments the thickness is about 0.01" to about 0.2". Smaller or larger sizes are also acceptable. Specialty shapes that are non-rectangular are also within the scope of the present invention. For example, in some embodiments, the embroidered stick can be in the shape of a birthday candle or a stack of ice cream scoops on a sugar cone.

In some embodiments, the embroidered stick is made from polyester, nylon, rayon, cotton or metallic threads sewn on fabric—usually twill. Twill is characterized by a diagonal rib. In some embodiments, twill weaves are used to produce strong, durable, firm fabric usually cotton or polyester. The type of fabric used is not limiting and can include denim, cotton, polyester, felt, wool or others.

In some embodiments, the embroidered stick is 100% fully embroidered on twill. In some embodiments, no twill fabric will show on the front of the design because it has complete thread coverage throughout. In some embodiments, the sticks are not 100% embroidered. In some embodiments, the embroidered stick is about 10%, about 20%, about 40%, about 50%, about 75% or about 90% embroidered.

In some embodiments, the border of the embroidered stick is made with a satin stitch and is laser cut. In some embodiments, the embroidered stick does not have a backing. In some embodiments, a woven or non-woven material is added as a backing on the embroidered stick. In some embodiments, the backing provides more support and stability. In some embodiments, the backing can comprise plastic, Velcro, iron on and sticky adhesive.

Figure 1:
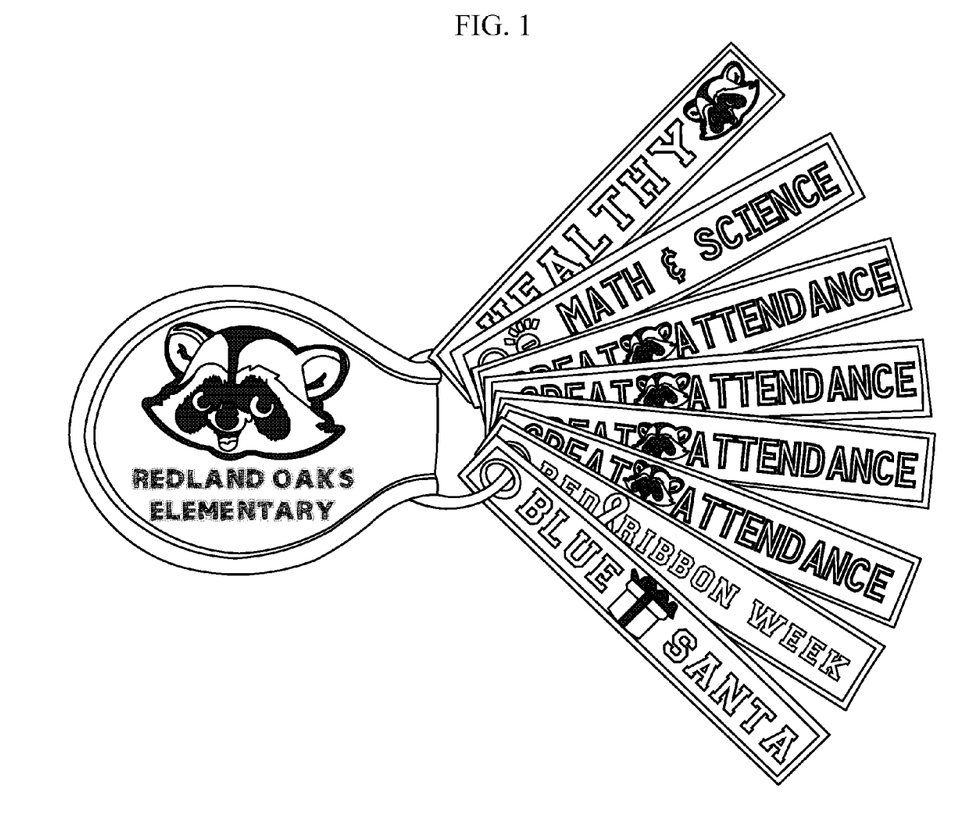
FIG. 1 shows embodiments of embroidered sticks attached to a key chain and that do not curl upon use.
Figure 2:
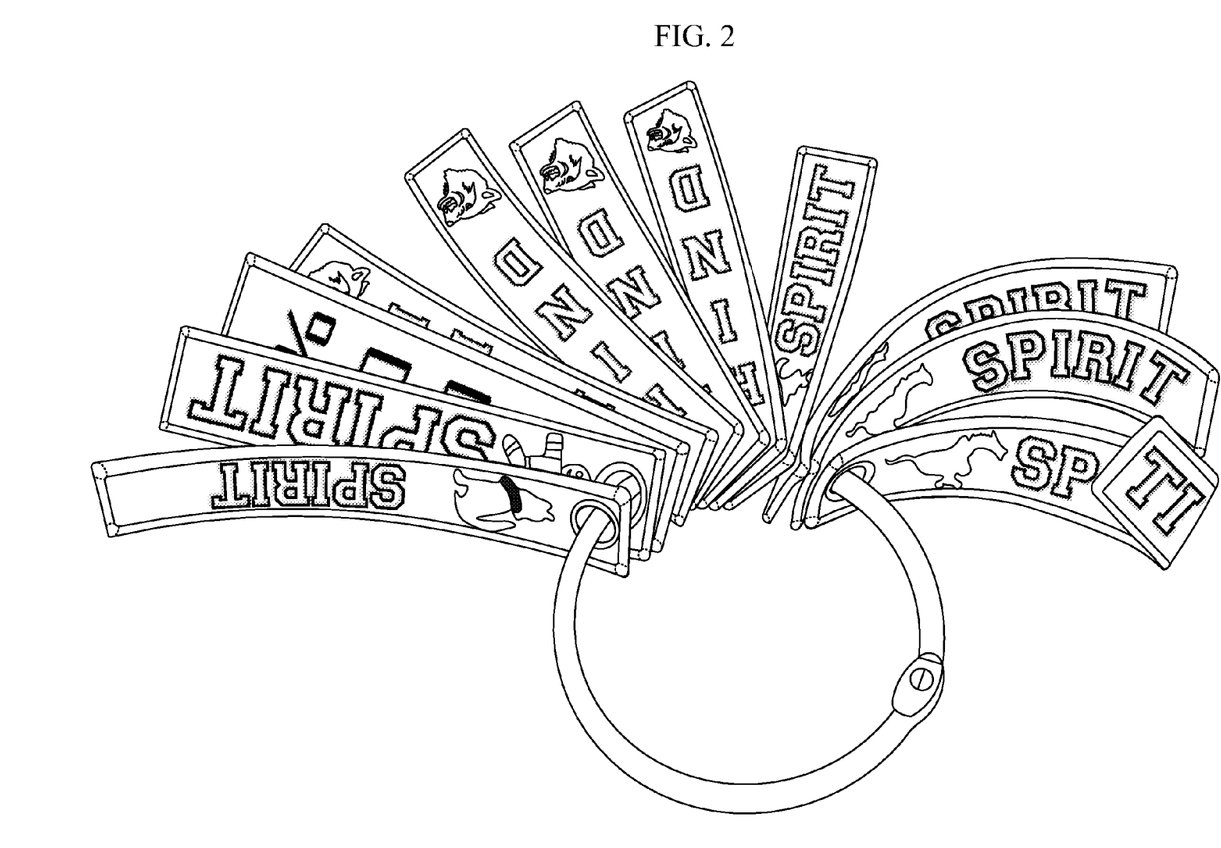
FIG. 2 shows embroidered sticks attached to a key chain.
Figure 3:
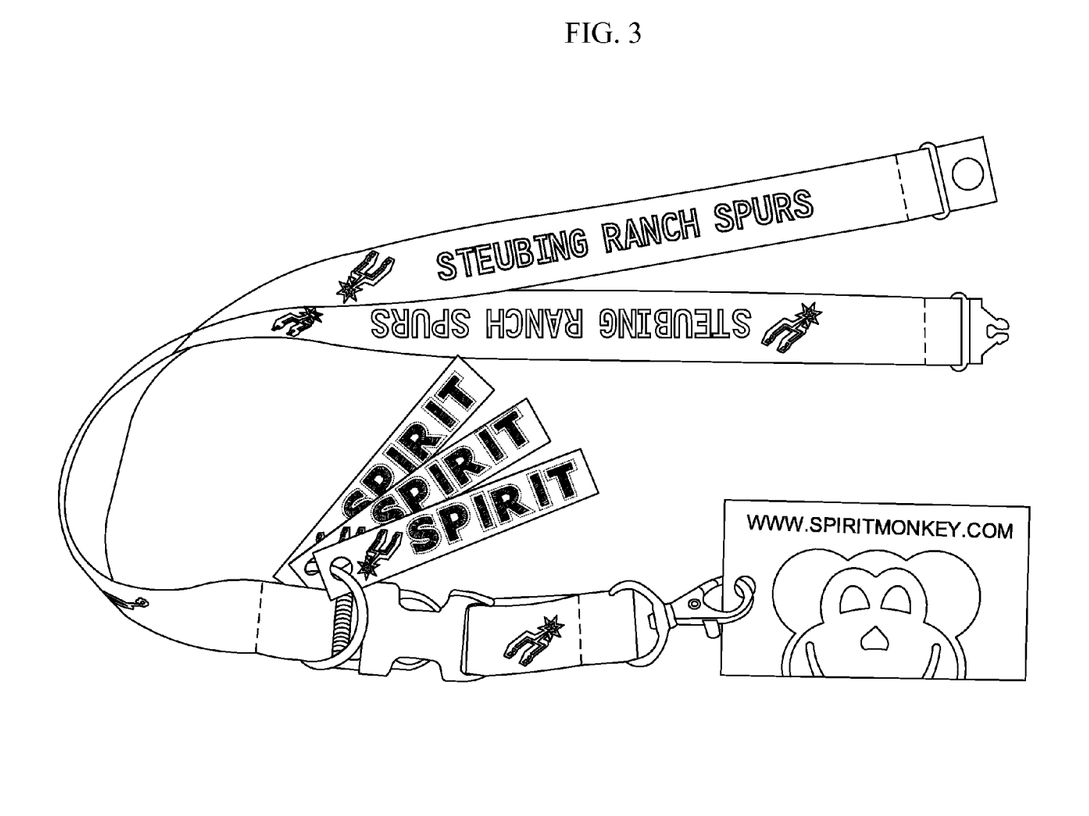
FIG. 3 shows an embodiment of embroidered sticks attached to a lanyard.
Figure 4:
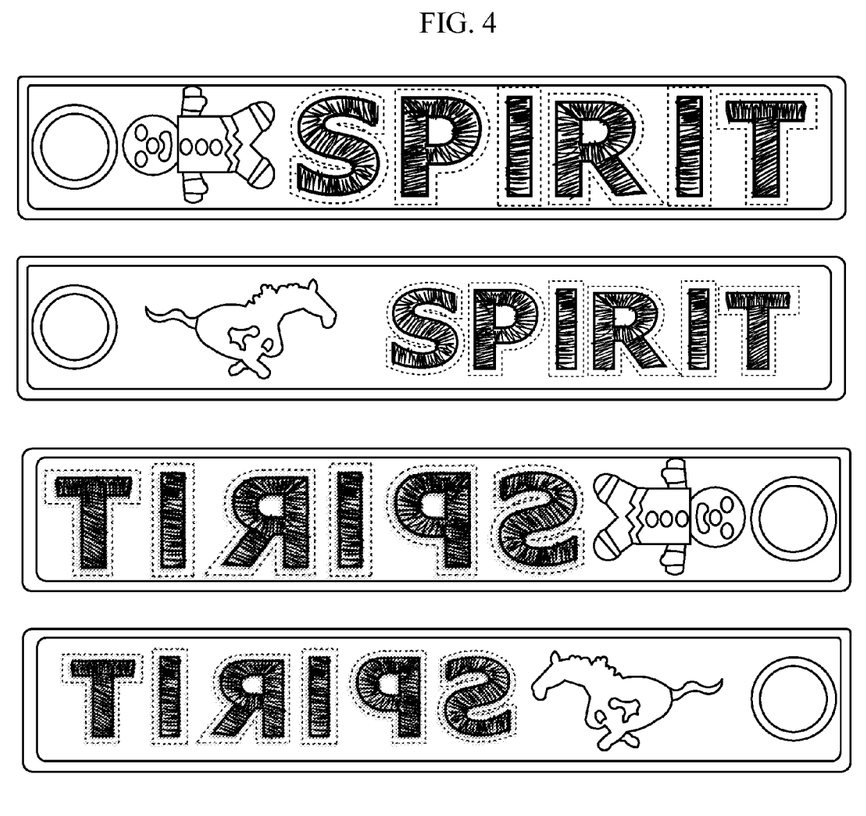
FIG. 4 shows the front and back of curled and uncurled sticks.

In some embodiments, the embroidered sticks without a backing have the advantageous property of not "curling" after extended use. In some embodiments, an anti-curling effect is achieved when the stitching is done in the horizontal direction, or left to right. During the development and testing of the invention, earlier versions were created with the stitching done vertically wherein curling occurred over a period of time and use. In some embodiments, stitching in the horizontal direction enables a straight, durable stick without the additional expense of a backing. FIG. 1 shows an embodiment wherein stitching is performed horizontally and no curling is observed. FIG. 2 shows a stick that exhibited curling wherein the stitching was performed in the vertical direction.

Figure 5:
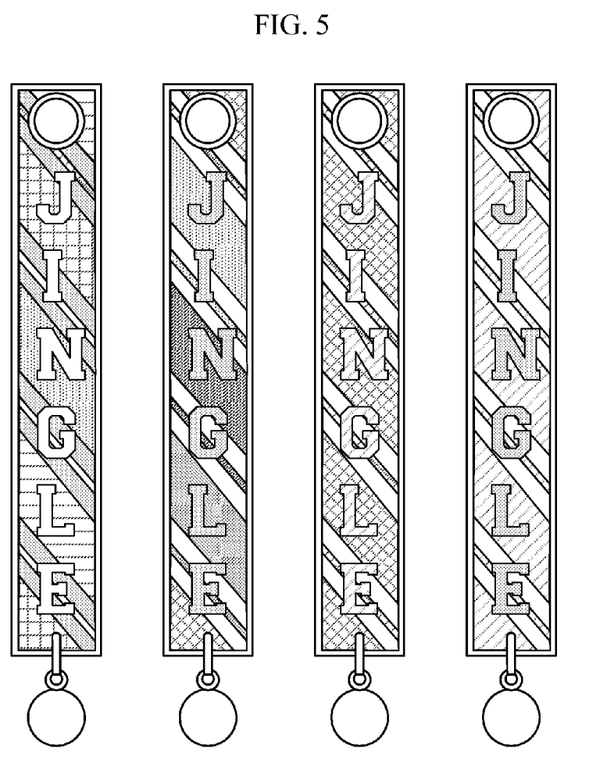
FIG. 5 shows an embodiment of an embroidered stick with an embellishing article attached to it.
Figure 6:
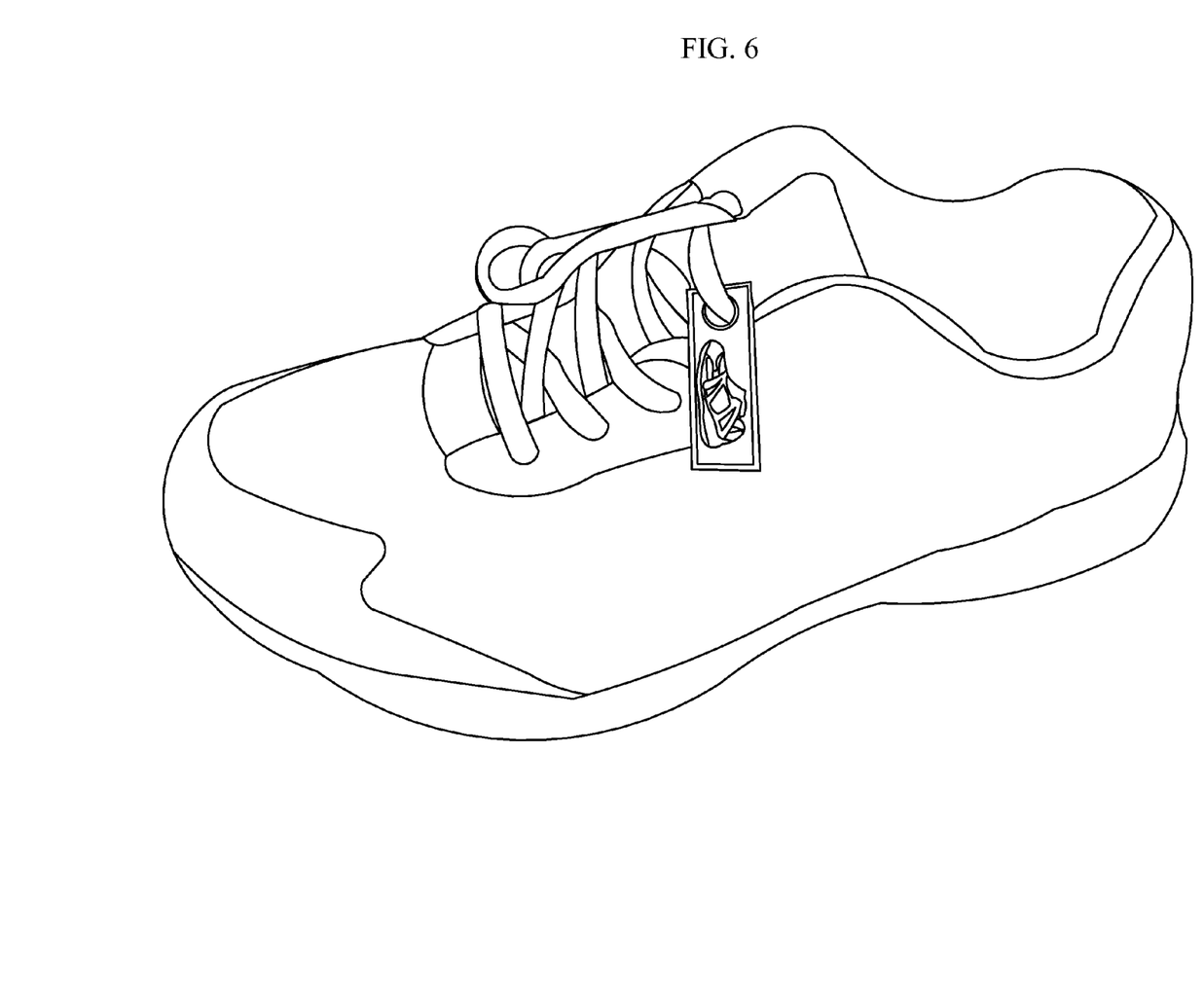
FIG. 6 shows an embodiment of an embroidered stick attached to a shoe lace.
Figure 7:
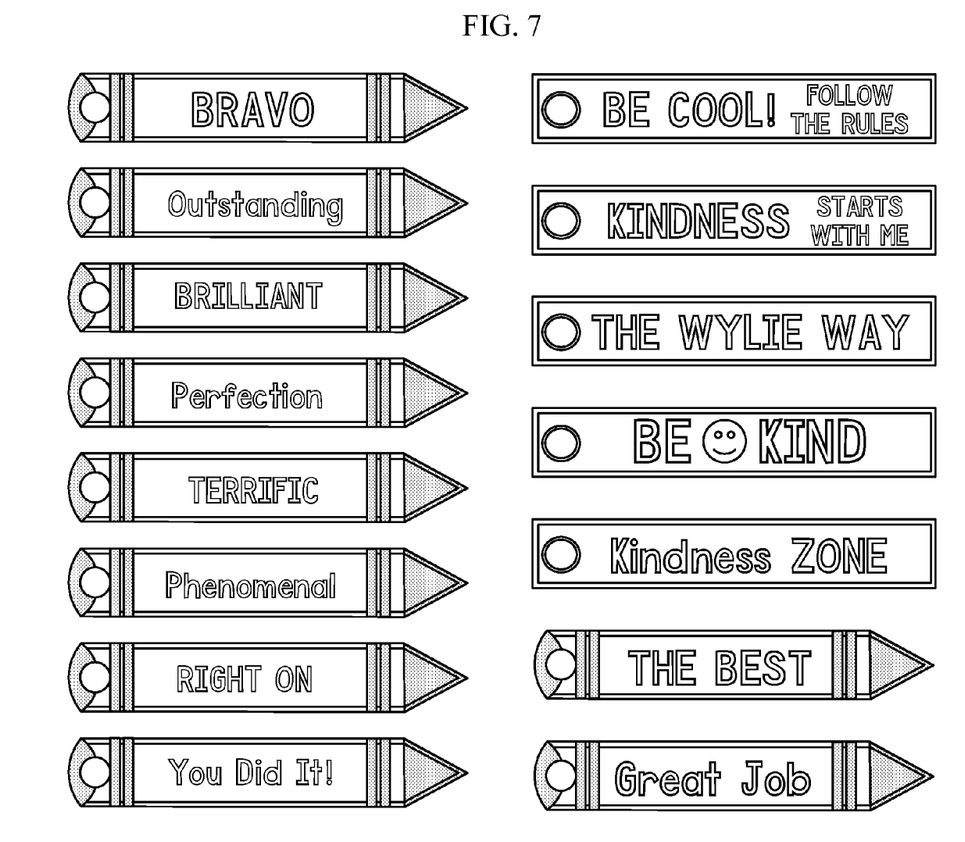
FIG. 7 shows embroidered sticks before they are hole punched. The reinforced hole is border stitched so the twill and stitches are protected before they punch a hole through the fabric.

In some embodiments, the embroidered sticks can be embellished by affixing other articles to the sticks. For example, in some embodiments, the embroidered sticks can be embellished by affixing them with bells, ornaments, ribbons or other objects. For example, the embroidered sticks can be embroidered with the word "Jingle" and affixed to one or more bells. In some embodiments, the embellishing article is affixed opposite the reinforced hole for hanging to a key ring or similar display instrument. An embodiment of an embroidered stick with an embellishment article attached is shown in FIG. 5.

In accordance with the present invention, the user of the embroidered stick is not limiting. In some embodiments, the user can be a child, such as a school aged child, or student. In some embodiments, the user is an adult. In some embodiments, the user is an ordinary consumer, such as a patron of a particular business or a consumer of a particular product or service. In some embodiments, the user is an employee of a business or organization. In some embodiments, the user is a member of an organization, club or athletic team. In some embodiments, the user is an individual seeking to promote various causes, messages, identity as a member of a group, campaigns, products, services, or brands with the embroidered stick. In some embodiments, the user is a sports fan wishing to promote a sports team and/or identify oneself as a fan.

In some embodiments, the invention provides small embroidered sticks that students can earn, collect, and display on their possessions, such as a lanyard, key ring, shoe lace, zipper, or backpack, for example. It has been discovered that the embroidered sticks are remarkably effective in promoting school spirit, and increased student participation and achievement by providing a meaningful extrinsic reward with lasting value, even beyond the school year.

In some embodiments, the embroidered sticks can be used by an organization, such as a school, to help define the organization's goals, culture and personality, and to provide a sense of belonging and membership to its members.

In one embodiment, the invention provides a method for rewarding an accomplishment, comprising providing an activity to a user; and providing one or more embroidered sticks to the user for achievement by the user of a goal within the activity.

In another aspect, the invention provides methods for rewarding a student, comprising providing the student with an embroidered stick, wherein the stick can be attached to and displayed on the student's possessions such as clothing, a lanyard, a backpack, shoe lace or a key ring, the reward stick comprising a front and back, two ends and two sides that are substantially longer than the ends, wherein the reward stick does not curl along its sides during use, and the reward stick further comprises a means for attaching one of its ends to the student's possessions. In some embodiments, the stick relates to a specified activity of the student, and the student is rewarded for achieving or performing the specified activity.

In another embodiment, the invention provides a method of providing rewards or incentives to a user, such as a child, for achievement of one or more goals or activities within an educational activity, by providing to the child one or more embroidered sticks when the child achieves the one or more goals or activities.

In some embodiments, the embroidered stick can be attached or affixed to an article. In some embodiments, the embroidered stick can be attached to an article such as, for example, a keychain, shoe lace, zipper, backpack, article of clothing, lanyard and the like.

While there have been shown and described what are presently believed to be the preferred embodiments of the present invention, those skilled in the art will realize that other and further embodiments can be made without departing from the spirit and scope of the invention described in this application, and this application includes all such modifications that are within the intended scope of the claims set forth herein. All patents and publications mentioned and/or cited herein are incorporated by reference to the same extent as if each individual publication was specifically and individually indicated as having been incorporated by reference in its entirety.

I claim:

1. An embroidered fabric stick that is embroidered with a phrase, word, icon or artwork, for attaching to and displaying on an article, wherein the embroidered stick comprises a reinforced hole positioned close to one of the ends of the embroidered stick for attaching one of its ends to the article, wherein the embroidered stick is substantially rectangular in shape and is from about 1.75 inches to about 4.5 inches in length and about 0.3 inches to about 1.0 inches in width, wherein the embroidered stick comprises a laser-cut, satin stitch border.

2. The embroidered stick of claim 1, wherein the embroidered stick comprises embroidery, said embroidery being selected from the group consisting of polyester, nylon, rayon, cotton and metallic threads sewn on the fabric.

3. The embroidered stick of claim 1, wherein the fabric is selected from the group consisting of denim, cotton, polyester, felt, twill, and wool.

4. The embroidered stick of claim 1, wherein the embroidered stick is 100% fully embroidered on twill.

5. The embroidered stick of claim 1, wherein the embroidered stick is affixed to another object.

6. The embroidered stick of claim 5, wherein the other object is selected from the group consisting of bells, ornaments and ribbons.

7. The embroidered stick of claim 1, wherein the embroidered stick does not curl along its sides upon use.

8. The embroidered stick of claim 1, wherein the embroidered stick is attached to a keychain.

9. The embroidered stick of claim 1, wherein the embroidered stick is attached to a backpack.

10. The embroidered stick of claim 1, wherein the embroidered stick is attached to an article of clothing.

11. The embroidered stick of claim 1, wherein the embroidered stick is attached to a lanyard.

12. The embroidered stick of claim 1, wherein said phrase or said word is selected from the group consisting of Perfect Attendance, On Time, Honor Roll, Spelling Bee, Spirit, A+Student, Healthy, Math and Science, Reading, and Great Attendance.

* * * * *